United States Patent [19]

Aoki

[11] 3,860,377
[45] Jan. 14, 1975

[54] AN INJECTION-BLOW MOLDING APPARATUS INCLUDING PRODUCT EJECTOR MEANS

[76] Inventor: Katashi Aoki, 6037 Oaza Minamijo, Sakaki-Machi, Japan

[22] Filed: Dec. 13, 1973

[21] Appl. No.: 424,593

Related U.S. Application Data

[62] Division of Ser. No. 292,473, Sept. 26, 1972.

[52] U.S. Cl. ............... 425/242 B, 425/DIG. 205, 425/DIG. 209, 425/DIG. 232, 425/438
[51] Int. Cl. ......................... B29c 5/06, B29d 23/02
[58] Field of Search ... 425/242 B, 387 B, DIG. 209, 425/DIG. 211, DIG. 213, DIG. 232, 326 B, 324 B, 438, DIG. 205

[56] References Cited
UNITED STATES PATENTS

| | | | |
|---|---|---|---|
| 3,616,491 | 11/1971 | Vollers | 425/242 B |
| 3,697,210 | 10/1972 | Johnson | 425/242 B X |
| 3,761,219 | 9/1973 | Flynn et al. | 425/DIG. 209 X |

*Primary Examiner*—Francis S. Husar
*Assistant Examiner*—David B. Smith

[57] ABSTRACT

An injection blow-molding process associated with a parison forming metal mold and a blow-molding metal mold each including a molding core and both being clamped between mold clamping plates commonly provided for these metal molds, comprising the steps of, after a parison is blown into an article in the blow-molding metal mold and just before the metal molds thus clamped are opened, shifting the blow-molding metal mold along the axial direction of the molding core included therein with the article retained in the blow-molding metal mold thereby to release the article from the molding core, and thereafter opening the metal molds for removing the article thus released from the molding core. An apparatus for practicing the process is also disclosed.

2 Claims, 7 Drawing Figures

AN INJECTION-BLOW MOLDING APPARATUS INCLUDING PRODUCT EJECTOR MEANS

This is a division of application Ser. No. 292,473, filed Sept. 26, 1972.

BACKGROUND OF THE INVENTION

This invention relates to an injection blow-molding process wherein a parison is firstly formed around a core in a parison forming metal mold by injection, and then is shifted into a blow-molding metal mold to be blown into an article, and a device for practicing the injection blow-molding process.

Heretofore, the articles produced in an injection blow-molding apparatus have been generally removed from the blow-molding metal mold utilizing an air pressure created through the blow-molding core. However, since the article in that case is forcibly separated from the neck of the blow-molding core, to which the article adheres tightly, under the action of the air pressure, and because the article is removed from the blow-molding core utilizing an inertia thereby caused, the article cannot be effectively removed from the core when the air pressure is too low. On the contrary, if the air pressure is excessively high, the article removed from the core would jump out of the blow-molding core, such a feature not only making it difficult to place the article in a desired position, but frequently damaging the product by hitting other structures.

SUMMARY OF THE INVENTION

An object of the present invention is to provide an improved process for the injection blow-molding technique, whereby the above described difficulty of the conventional technique is substantially overcome.

Another object of the invention is to provide an improved injection blow-molding apparatus wherein the above described difficulty can be substantially eliminated.

Still another object of the invention is to provide an improved injection blow-molding apparatus wherein the releasing of an article from the neck of a blow-molding core can be carried out in a simple manner.

These and other objects of the present invention can be achieved by an improved process and apparatus according to the invention, wherein:

The process associated with an apparatus including a parison forming metal mold and a blow-molding metal mold each including a molding core and both being clamped between commonly provided mold clamping plates, comprises essentially the steps of, after a parison is blown into an article in the blow-molding metal mold and just before the metal molds commonly clamped by the mold clamping plates are opened, shifting the blow-molding metal mold outwardly along the axial direction of the molding core included therein with the article held in the blow-molding metal mold thereby to release the article from the molding core, and thereafter opening the metal molds for removing the article thus separated from the molding core.

The apparatus including a parison forming metal mold and a blow-molding metal mold each separable into two mold-halves, two mold clamping plates supporting said mold-halves of said metal molds at opposing positions, an injection nozzle directed to said parison forming metal mold, and a supporting plate supporting molding cores on both sides thereof and rotatable around an axis so that the molding cores can be transferred between said metal molds, further comprises, according to this invention, a hydraulic device for shifting said blow-molding metal mold along the axial direction of the molding core included in the blow-molding metal mold.

The nature, principle, and utility of the present invention will be more clearly understood from the following detailed description of the invention when read in conjunction with the accompanying drawings wherein like parts are designated by like reference numerals.

DETAILED DESCRIPTION OF THE INVENTION

Figure 1:
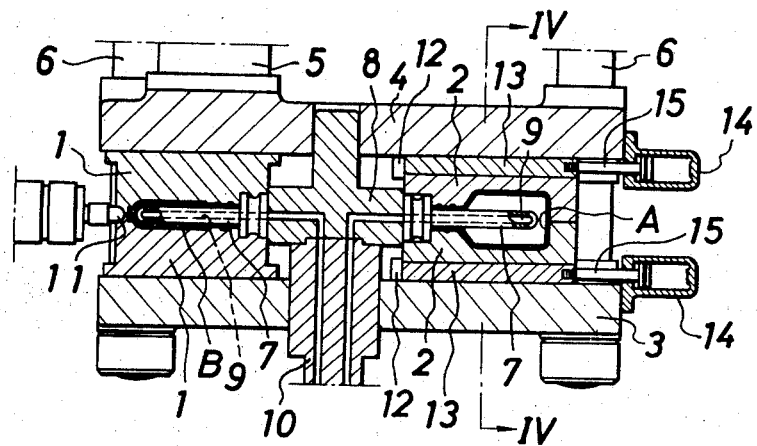
FIG. 1 is a cross-sectional plan view of an injection blow-molding apparatus according to the present invention wherein the formation of a parison and the blowing thereof into an article are carried out simultaneously.

Referring firstly to FIGS. 1 through 4 showing a first embodiment of the present invention, there are indicated a parison forming metal mold separable into mold-halves 1, 1, and a blow-molding metal mold separable into mold-halves 2, 2. A parison forming mold-half 1 and a blow-molding mold-half 2 are fixed to a stationary mold supporting plate 3, and another parison forming mold-half 1 and another blow-molding mold-half 2 are fixed to corresponding positions on a surface of a mold clamping plate 4 confronting to the mold supporting plate 3.

The mold clamping plate 4 is made reciprocable along a plurality of parallelly disposed tie-rods 6, 6, .. . extended between the mold supporting plate 3 and another stationary plate (not shown) by means of a hydraulic ram 5 provided on the rear side surface of the mold clamping plate 4.

Molding cores 7, 7 corresponding to the metal molds 1, 2 are fixed to both sides of a supporting plate 8 rotatable around an axis thereof in such a manner that the molding cores 7, 7 can be swung around along the parting surface of the metal molds 1, 2. Through each of the molding cores 7, 7 a blowing hole 9 opening at an end of the molding core is bored longitudinally.

The rotating shaft 10 of the supporting plate 8 for supporting the molding cores 7, 7 is extended through central holes of the mold supporting plate 3 and the mold clamping plate 4, and at the side of the mold clamping plate 4, the shaft 10 is loosely inserted in the central hole so that the mold clamping plate 4 can be slidable along the axial direction of the rotating shaft 10.

An injection nozzle 11 is provided to be directed to the parting line of two mold-halves 1, 1 of the parison forming metal mold, and molten resin is injected into a cavity between the 7 and the parison forming metal mold 1.

According to the present invention, the blow-molding mold-halves 2, 2 are not fixed to both of the mold supporting plate 3 and the mold clamping plate 4, but are made slidable relative to these plates 3, 4, so that the blow-molding mold-halves 2, 2 are moved in the axial direction of the molding core 7 included therein before the blow-molding mold-halves 2, 2 are opened, and the separation of an article A formed therein from the molding core 7 and the removal thereof from the blow-molding metal mold 2 are thereby facilitated.

In order to make the blow-molding mold-halves 2, 2 slidable against the mold supporting plate 3 and the mold clamping plate 4, a pair of guiding rails 12 are fixed to each of these plates 3, 4 on their opposing surfaces so that the guiding rails 12 are extended along the axial direction of the molding core 7 with a distance maintained between each of the rails. Between these rails 12, a seating plate 13 freely shiftable along the rails 12 is provided, and each mold-half 2 of the blow-molding metal mold 2 is fixed to the seating plate 13 (refer to FIG. 4). An end of the each seating plate 13 is fixed to a plunger 15 cooperative with a hydraulic cylinder 14, and the other end of the cylinder 14 is fixed to the mold supporting plate 3 or the mold clamping plate 4 or to a structural member of the apparatus.

According to the process of the present invention, the mold clamping plate 4 is advanced to close and clamp the parison forming metal mold 1 and the blow-molding metal mold 2. Then a parison B having bottom is formed by injection in the parison forming metal mold 1 around its molding core 7, and, in the blow-molding metal mold 2, a parison previously formed is blown into an article A through the hole 9 in the molding core 7.

After completion of the article A, the blow-molding metal mold 2 is not opened at once as in the conventional processes, but is shifted in the axial direction of the molding core 7 with the article A retained in the mold 2 by retracting the plungers 15, 15 which have been pushed out under the operation of the hydraulic cylinders 14, 14. In this case, the blow-molding metal mold 2 is guided in the above-mentioned direction by the seating plate 13, 13 cooperating with the guiding rails 12, 12. The article A is thus forcibly separated from the neck portion of the molding core 7, and is placed in a state easily removable from the blow-molding metal mold 2. Then, the mold clamping plate 4 is retracted by means of the hydraulic ram 5, and both of the metal molds 1 and 2 are opened simultaneously. The supporting plate 8 supporting the molding cores 7, 7 is rotated in a direction causing the molding core supporting the article A to direct downwardly, whereby the article A is removed from the blow-molding metal mold 2 under the gravity or by means of an article removing device. When the molding core 7 is formed into a gradually narrowing configuration toward the free end, the natural falling of the article A is facilitated. Alternatively, the article A may be blown down by air through the molding core, and in this case, the air pressure may be far lower than the case where the article A is not forcibly separated from the molding core, whereby there is no possibility of the article A being blown off at a high speed as in the case of the conventional processes.

Figure 2:
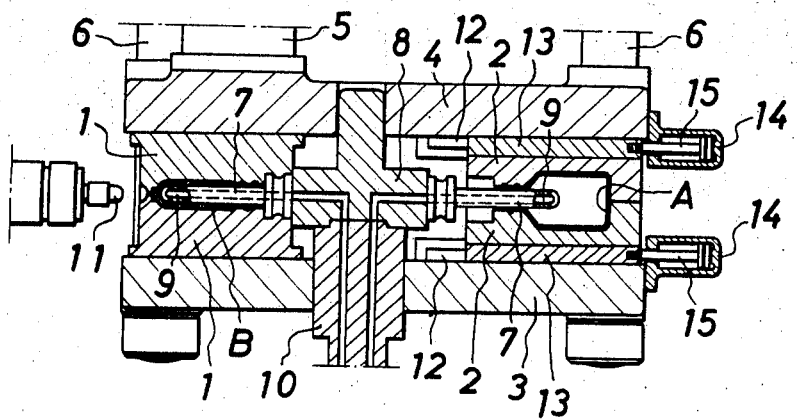
FIG. 2 is view similar to FIG. 1, wherein the article thus blown is released from the molding core.
Figure 3:
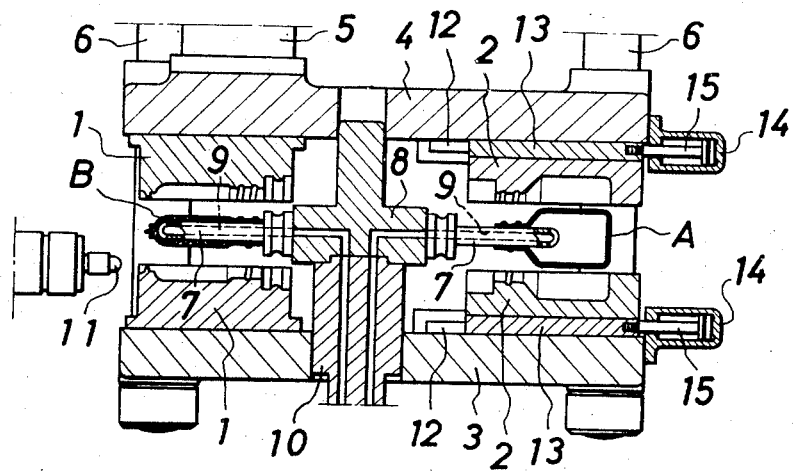
FIG. 3 is also a view similar to FIG. 1, wherein the metal molds are opened and the article is about to be removed from the blow-molding metal mold.
Figure 4:
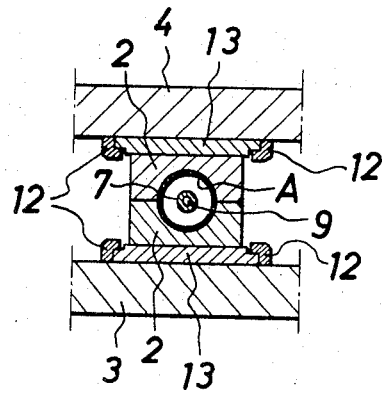
FIG. 4 is a trasversal setional view taken along the line IV—IV in FIG. 1.
Figure 5:
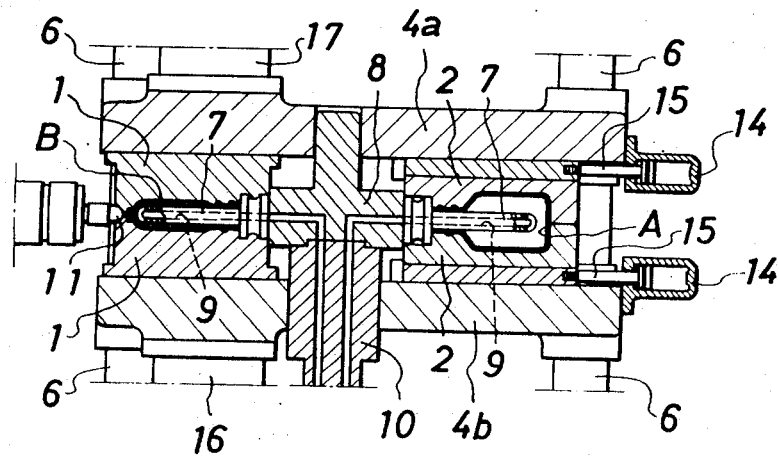
FIGS. 5 through 7 are cross-sectional plan views of another embodiment of the invention, which is placed in operational states similar to those indicated in FIGS. 1 through 3, respectively.
Figure 6:
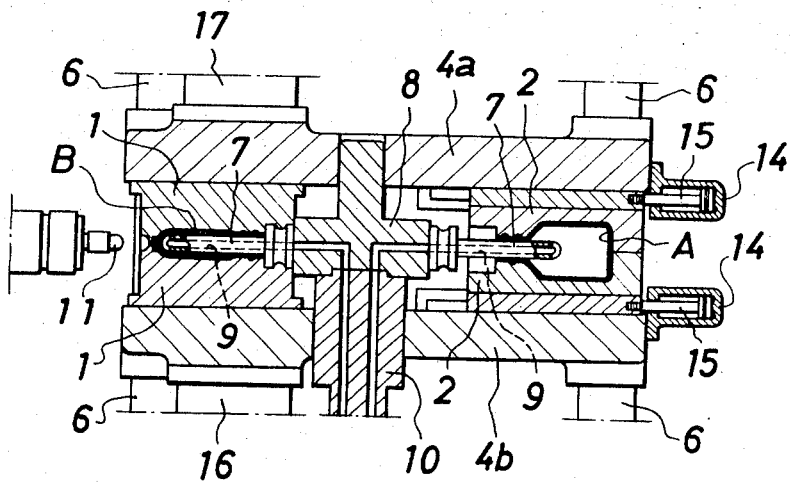
Figure 7:
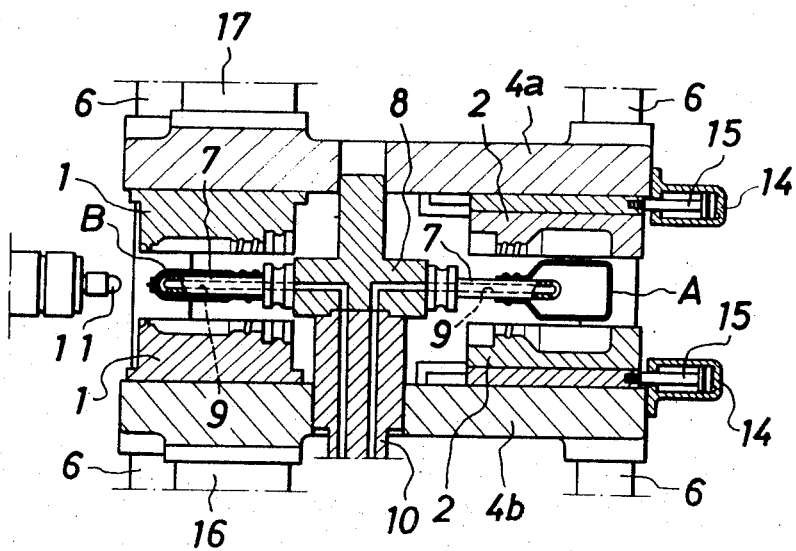

In FIGS. 5 through 7, there are indicated various operational states of another embodiment of the present invention corresponding to those indicated in FIGS. 1 through 3. In this embodiment, the above-mentioned stationary mold supporting plate 3 and the mold clamping plate 4 are replaced by two mold clamping plates 4a and 4b. On the rear sides of the mold clamping plates 4a, 4b, hydraulic rams 16, 17, each of which is similar to the ram 5 in the previous embodiment, are provided and fixed to the mold clamping plates 4a, 4b.

Thus, in this embodiment of the invention, the two mold clamping plates 4a and 4b are simultaneously moved along the tie-rods 6, 6, . . . extended parallelly between two stationary members (not shown) of the apparatus, and the parison forming metal mold 1 and the blow-molding metal mold 2 are thereby open-or-closed. Since the operation of this embodiment is quite similar to that of the previous embodiment, no further detailed description will be undertaken, except that like reference numerals are affixed to like parts thereof.

According to the present invention, since the blow-molding metal mold is shifted in the longitudinal direction of the molding core included therein just before the metal mold is opened, the removal of the article can be carried out easier than in the case where the separation and removal of the article are executed by an air pressure. Furthermore, the separation of the article from the neck portion of the molding core in this invention is realized by the shifting along the longitudinal direction of the molding core of the blow-molding metal mold entirely retaining the article in the mold, whereby any chance of damaging the article is substantially reduced. In addition, since no complicated mechanism other than those required for simply shifting the blow-molding metal mold in the longitudinal direction of the molding core is required in this apparatus, the production or modification of the apparatus is very easy.

I claim:

1. An injection blow-molding apparatus including a parison forming metal mold and a blow-molding metal mold, each separable into two mold-halves, a mold clamping plate and a mold supporting plate supporting said mold-halves of said metal molds at opposing positions thereon, two pairs of guide rails fixedly mounted on the opposing surfaces of the mold supporting plate and the mold clamping plate, respectively, an injection nozzle directed to said parison forming metal mold, and a supporting plate for supporting molding cores on both sides thereof and rotatable around the axis of a shaft of said supporting plate so that the molding cores are transferred from said parison forming metal mold to said blow-molding metal mold, said guide rails being extended in parallel with the centrally located molding core wherein a constant distance is maintained in each pair of the guiding rails, two seating plates each supporting one mold-half of the blow-molding metal mold are inserted freely between said respective pairs of guide rails on the mold supporting plate and the mold clamping plate, and a plunger cooperable with a hydraulic cylinder having an end thereof fixed to a stationary member of the apparatus is fixed to each of the two seating plates.

2. An apparatus as defined in claim 1 wherein said mold supporting plate and said mold clamping plate are both provided with a hydraulic ram on each rear side surfaces thereof, whereby these plates are made operable as a pair of mold clamping plates simultaneously advanced or retracted along tie-rods commonly provided for these two plates.

* * * * *